United States Patent [19]

Geck et al.

[11] 4,110,108

[45] Aug. 29, 1978

[54] METHOD OF PRODUCING CAST IRON

[75] Inventors: Hans Günter Geck, Hagen; Fritz Kruse, Dortmund-Brechten, both of Fed. Rep. of Germany

[73] Assignee: Klöckner-Werke AG, Duisburg, Fed. Rep. of Germany

[21] Appl. No.: 778,139

[22] Filed: Mar. 16, 1977

[30] Foreign Application Priority Data

Mar. 18, 1976 [DE] Fed. Rep. of Germany ....... 2611458

[51] Int. Cl.² ............................................. C21C 7/00
[52] U.S. Cl. ....................................... 75/48; 75/44 S; 75/46; 75/130 R
[58] Field of Search ............... 75/48, 43, 44 R, 44 S, 75/46, 130

[56] References Cited

U.S. PATENT DOCUMENTS

| 740,025 | 9/1903 | Koneman | 75/48 |
|---|---|---|---|
| 1,887,453 | 11/1932 | Emmel | 75/48 |
| 1,937,064 | 11/1933 | Moore | 75/48 |

FOREIGN PATENT DOCUMENTS 157,295  4/1922  United Kingdom ...................... 75/48

*Primary Examiner*—M. J. Andrews
*Attorney, Agent, or Firm*—Michael J. Striker

[57] ABSTRACT

A charge of iron-containing metallic substance is melted in a melting vessel, and the molten metallic substance is passed through a body of carbonaceous material contained in a treating container for the metallic substance to be enriched with carbon. The treating container is gas-tightly sealed except for its communication with the melting vessel. At least oxygen is admitted into the treating container to partly and gradually burn the carbonaceous material and thus to heat the metallic substance passing through the body. The body may contain alloying elements and/or slag-forming constituents. The enriched molten metallic substance and slag which form a bath at the bottom of the treating container are discharged therefrom through respective discharging outlets which are provided with traps. The gases which are liberated during the passage of the molten metallic substance through the body of carbonaceous material are utilized for heating either the body or the charge of metallic substance in the melting vessel.

11 Claims, 1 Drawing Figure

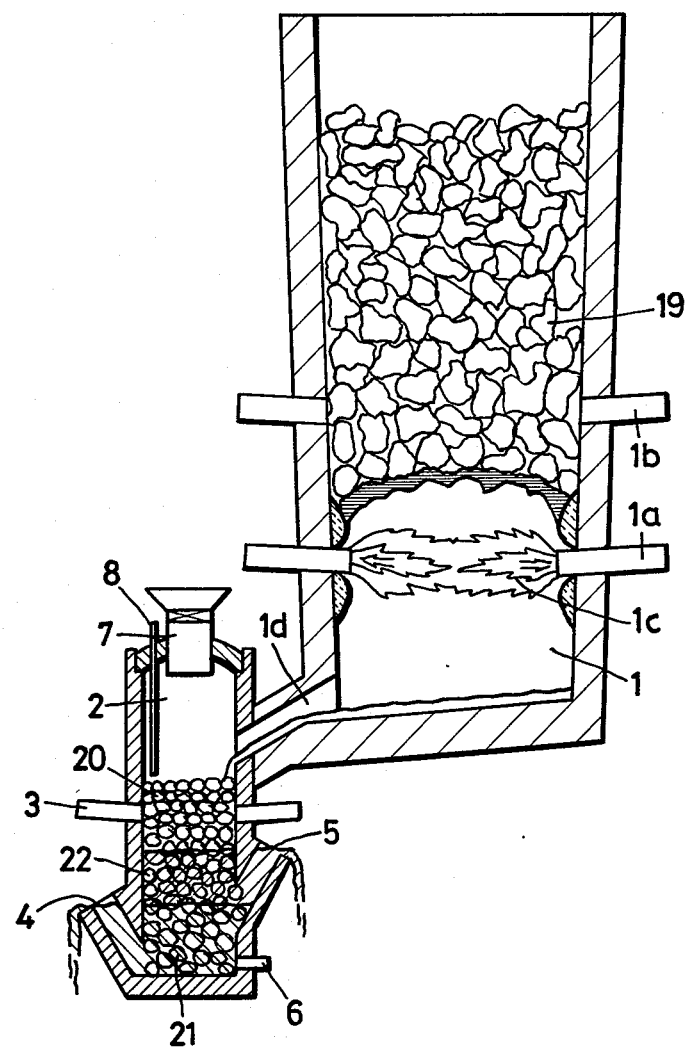

METHOD OF PRODUCING CAST IRON

BACKGROUND OF THE INVENTION

The present invention relates to a method of producing cast iron and to the apparatus for performing such a method.

It is already known to produce cast iron by melting scrap, sponge iron and similar iron-containing metallic substances, such as by melting such metallic substances by means of an oxidizing flame, and to subsequently enrich the molten metallic substance with carbon, alloying elements and the like and additionally heat the enriched metallic substance.

For the production of cast iron for use in casting installations, it has been already proposed to utilize cupola ovens which are heated either by means of coke or of natural gas, and to utilize scrap, raw iron, casting scrap, sponge iron and similar metallic substances as the starting materials. Relatively large amounts of coke are to be employed in a coke-heated cupola oven, and a relatively long transient time period is required at the beginning of the operation of the cupola oven before the cupola oven operates according to the required parameters. During such transient time periods, there is produced a substantial amount of intermediate iron of low quality. In addition thereto, during the production of cast iron in such a cupola oven, the iron-containing metallic substance acquires a substantial amount of sulphur, and the degree of enrichment of the metallic substance by carbon cannot be controlled, so that the flowable metal must be separated from the slag and must be subsequently further treated. Even when the cupola oven is operated by utilizing natural gas for heating the interior thereof, there remains the necessity to provide a treating vessel, such as an induction or an electric arc discharge oven downstream of the cupola oven, in which the molten metallic material is enriched with carbon, alloyed and further heated to a required temperature. Inasmuch as electric energy is consumed during such further treatment, and an expensive aftertreatment vessel is required, this process is very expensive.

SUMMARY OF THE INVENTION

Accordingly, it is a general object of the present invention to avoid the disadvantages of the prior art.

More particularly, it is an object of the present invention to provide a method of producing cast iron which is not possessed of the disadvantages of the prior-art methods.

It is a further object of the present invention to provide a method of producing cast iron which renders it possible to produce cast iron in a simple and economical manner.

A still another object of the present invention is to devise a method of producing cast iron which renders it possible to achieve a controlled enrichment of the metallic substance with carbon and alloying elements.

A concomitant object of the present invention is to design an apparatus which is capable of operating according to the method of the present invention.

An additional object of the present invention is to so construct the apparatus that it be simple in construction, reliable in operation and inexpensive to manufacture.

In pursuance of these objects and others which will become apparent hereafter, one feature of the present invention resides, briefly stated, in a method of producing cast iron from scrap, sponge iron and similar iron-containing metallic substances, which comprises the steps of melting a metallic substance in a first zone; confining a body of carbonaceous material in a second zone; passing the molten metallic substance through the body of carbonaceous material to become enriched with carbon; and maintaining a bath of the enriched molten metallic substance and of slag at the bottom of the second zone. Preferably, the melting step includes exposing the metallic substance to an oxidizing flame, and the confining step includes adding alloying agents to the body of carbonaceous material for alloying with the molten metallic substance during the passing step.

The molten metallic substance will trickle through the body of carbonaceous material, which renders it possible to achieve controlled continuous enrichment of the metallic substance with carbon. The body of carbonaceous material constitutes a reducing system so that oxidation-sensitive additions can be introduced into the body and kept therein without any losses. The method of the present invention renders it possible to avoid the use of electric energy and, in addition thereto, to keep the consumption of the carbonaceous material, preferably coke, at a low level. As a result of the presence of the bath of the molten enriched metallic substance and of slag at the bottom region of the second zone, it is possible to perform a slag-forming operation in the region of the body of carbonaceous material, such as a de-sulfurizing operation. The degree of the enrichment of the molten metallic substance with carbon is controlled by selecting the reactivity, the particle size of the carbonaceous material and the height of the body of carbonaceous material, as well as by controlling the temperature during the passage of the metallic substance through the body of carbonaceous material. According to a further aspect of the present invention, the maintaining step includes separating the slag from the enriched molten metallic substance at the bottom of the second zone. Under these circumstances, the level of the metallurgical work can be changed and influenced by adjusting the levels of the metallic bath and of the slag. The metal which has been passed through the body of carbonaceous material can be continuously discharged into a ladle in which it is being accumulated. Corrections of the analysis or composition of the enriched metallic substance can be attended to, if necessary, while the molten metallic substance is accommodated in the ladle. The ladle may be provided with all necessary arrangements for enabling such composition corrections, and with a sink.

According to a further concept of the present invention, the method further comprises the step of heating the body of carbonaceous material to a predetermined temperature, including introducing an oxygen-containing medium into the second zone and contacting the same with the carbonaceous material to partially combust the latter. The heating step may further include introducing a combustible medium into the second zone, and combusting the same with the oxygen-containing medium.

The method of the present invention may further comprise the steps of measuring the temperature of the enriched molten metallic substance, and controlling the heating step in dependence on the measured temperature. Furthermore, it is advantageous and proposed by the present invention to provide the step of measuring the height of the body of carbonaceous material in the second zone, and replenishing the body in dependence on the measured height with additional carbonaceous material. The method of the present invention may further comprise the step of introducing a finely particulate metallic substance selected from the group consisting of scrap and sponge iron into the second zone for entrainment in the body of carbonaceous material. In addition thereto, alloying elements and slag-forming constituents may be added to the material of the body of carbonaceous material.

Advantageously, the method of the present invention further comprises the step of utilizing combustible gases developing in the second zone during the passage of the molten metallic substance therethrough as a fuel for heating the metallic substance in the first zone during the melting step, or for heating the body of carbonaceous material in the second zone. As a result of this utilization of the liberated gases containing carbon monoxide and hydrogen, the energy utilization is further improved during the operation of the arrangement of the present invention. Such arrangement, according to a further concept of the present invention, is designed for producing cast iron from scrap, sponge iron and similar iron-containing metallic substances, the arrangement comprising means for keeping a charge of a metallic substance in a first zone; means for melting the metallic substance in the first zone; means for confining a body of carbonaceous material in a second zone, means for conveying the molten metallic substance from the first to the second zone for the molten metallic substance to pass through the body of carbonaceous material and become enriched with carbon; and means for maintaining a bath of the enriched molten metallic substance and of slag at the bottom of the second zone. Preferably, the keeping means includes a melting vessel and the confining means includes a treating container. The treating container is air-tight and the conveying means air-tightly communicates the melting vessel with the treating container above the body.

The treating container comprises at least one discharging outlet for the bath at the bottom thereof, and the maintaining means includes a trap in the discharging outlet which prevents flow of gaseous media through the discharging outlet. The above-mentioned discharging outlet is used for discharging the enriched molten metallic substance from the treating container, and a slag-separating and discharging means is provided upwardly of the discharge conduit and gas-tightly separates the interior of the treating vessel from the exterior thereof.

The arrangement of the present invention advantageously further comprises support means communicating with the interior of the treating container at the elevation of the above-mentioned body and operative for admitting an oxygen-containing medium thereinto. Preferably, the supply means is also operative for admitting a combustible medium into the interior. The arrangement of the present invention, under these circumstances, may further comprise a burner located in the region of the above-mentioned body and communicating with said supply means.

A further facet of the present invention resides in the fact that the transverse dimensions of the treating container are considerably smaller than those of the melting vessel. Preferably, the treating container has an interior lining of a refractory material, particularly of a basic refractory material.

The above-mentioned burner raises the temperature of the body of carbonaceous material to such a level that the latter glows. Gases which are liberated from the body of carbonaceous material during the passage of the molten metallic substance therethrough and which contain carbon monoxide and hydrogen can be used as a fuel for the above-mentioned burner. On the other hand, it is also possible to use oil, natural gas and similar combustible media as fuels in the burner. On the other hand, it is also possible to bring the temperature of the body of carbonaceous substance to the desired level only by admitting air and/or oxygen into the interior of the treating container at the region of the body of carbonaceous material contained therein, whereby such carbonaceous material becomes partially combusted and thus liberates heat which increases the temperature of the molten metallic substance passing through the carbonaceous material body.

According to a currently preferred advantageous concept of the present invention, the treating container is hermetically sealed and the conveying means disconnectably connects the treating container with the melting vessel. When the starting materials present in the melting vessel are melted by means of oxygen-fuel burners, the gaseous media which are liberated or generated in the treating container can be utilized in the melting vessel for melting the starting materials or metallic substances contained in the latter. In order to obtain a closed reducing system in the treating container, and to maintain such a system, the treating container is equipped with means for gas-tightly closing the treating container.

To achieve a better control for the enrichment of the molten metallic substance with carbon and alloying elements, the treating container may be provided with means for measuring the height of the body contained therein, with means for replenishing the body with additional carbonaceous material, and means for operating the replenishing means in dependence on the indication of the measuring means. In addition thereto, the treating container may be equipped with means for measuring the temperature of the enriched molten metallic substance discharged from the treating container through the above-mentioned discharging outlet, and with means for controlling the temperature within the treating container in dependence on the indication of the measuring means. In the currently preferred embodiment of the present invention, the latter control means includes means for regulating the flow of the above-mentioned oxygen-containing medium and/or of the combustible medium into the interior of the treating container.

The method of the present invention can be best preformed, in an extremely simple and advantageous manner and with a low energy consumption, when the melting is achieved in countercurrent by means of exposing the metallic substance to be melted from below to heat generated by oxygen-fuel burners. Such melting procedure is very well known so that it need not be elaborated upon herein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The sole FIGURE of the drawing is a somewhat diagrammatic sectional view of an example of the embodiment of the present invention.

DETAILED DISCUSSION OF THE PREFERRED EMBODIMENT

Referring now to the drawing, it may be seen therein that the arrangement of the present invention includes a melting vessel 1 which has a substantially constant inner cross-section and which is provided, at its lower region, with a plurality of burners 1a arranged in an annular fashion. Oxygen and fuel, such as natural gas, are introduced into and burned in the interior of the melting vessel 1 by the burners 1a.

The melting vessel 1 is charged from above with a metallic substance, such as metal scrap, sponge iron and similar metallic substances, to thereby obtain a charge column 19 of the metallic substance in the interior of the melting vessel 1. The burners 1a generate a flame 1c which acts on the lower end of the charge column 19 and thus gradually melts the metallic substance thereof. As a result of the gradual melting, the lower portion of the charge column 19 assumes an arched configuration upwardly of the flame 1c. The charge column 19 is supported in the region upwardly of the burners 1a on protuberances which are formed in a known manner on the interior surface of the circumferential wall of the melting vessel 1.

The molten metallic material, among others, also runs along the inner surfaces of the melting vessel 1 in the downward direction toward the bottom of the melting vessel 1, over such bottom to an outlet 1d. The molten metallic substance flowing on the various walls simultaneously constitutes a protection of the refractory lining material in such regions, which protects such surfaces and linings from the deleterious influences of the flame 1c. The waste gases which are generated during the melting operation can be afterburned by means of a secondary air and simultaneously pre-heat the starting material or solid metallic substance.

The secondary air can be supplied by means of inlets 1b upwardly of the melting region.

Even though the above-mentioned melting of the metallic substance is currently preferred and also economically attractive, other melting operations and arrangements can also be used in the arrangement of the present invention.

The starting material or metallic substance is melted in the melting vessel 1 under oxidizing conditions and leaves the melting vessel 1 through the outlet 1d thereof, together with the iron-oxide slag produced during the melting operation. The flowable molten metallic substance which leaves the interior of the melting vessel 1 is at a temperature only slightly above the liquidus temperature thereof.

The outlet 1d of the melting vessel 1 communicates with an upper portion of a treating container 2 which is usually connected with the melting vessel 1 in a gas-tight manner and in a disconnectable fashion. The treating container 2 is equipped with a replenishing arrangement 7 which includes a replenishing hopper and a hermetically sealable inlet valve, the replenishing arrangement 7 being mounted in the lid of the treating container 2. The replenishing arrangement renders it possible to introduce particulate materials into the interior of the treating vessel 2 without running the danger of admitting air into the interior. The replenishing arrangement 7 is used for introducing a solid carbonaceous material, particularly coke, into the interior of the treating container 2 to form a body 20 of such a carbonaceous material in the interior of the treating container 2. In addition thereto, the replenishing arrangement 7 can be used for introducing slag-forming constituents, alloying elements, and oxidation-sensitive sponge iron, into the interior of the treating container 2.

A raised discharge outlet 4 for metal is provided at the bottom of the treating container 2, and a slag-discharge outlet 5 is provided upwardly of the metal-discharge outlet 4. The outlets 4 and 5 operate according to the principle of a trap and serve to separate slag from metal. A tapping hole 6 is provided at the bottom of the treating container 2 which renders it possible to fully discharge the contents of the treating container 2.

Supply inlets 3 for air, oxygen-enriched air or oxygen are provided in the region of the body 20 of carbonaceous material, and the oxygen introduced into the interior of the treating container through such supply inlets 3 serves to bring the material of the body 20, such as coke, to a temperature at which this material glows. However, the supply inlets 3 can also be constructed as burners which burn fuel with oxygen in order to heat the body 20 of carbonaceous material.

The mixture of the molten metal and slag produced in the melting vessel 1 flows from the outlet 1d of the latter into the treating container 2 arranged downstream of the melting vessel 1. Thereupon, such mixture trickles through the body 20 of carbonaceous material, and a metallic bath 21 is eventually formed at the bottom of the treating container 2, as well as a slag layer 22 commencing at the upper surface of the metallic bath 21. The metallic substance which became enriched with carbon and/or alloying elements during the passage thereof through the body 20, is continuously discharged from the metal-discharge outlet 4, while the slag is continuously discharged through the slag-discharging outlet 5.

As a result of a gradual and partial combustion of the carbonaceous material of the body or column 20, this material is heated to a temperature which is necessary for the required superheating of the molten metallic substance and for the performance of the reactions taking place during the passage of the molten metallic substance through the body 20. During the passage of the molten metallic substance through the column 20, a reduction of iron oxides formed during the melting operation, enrichment of the molten metallic substance with carbon and/or alloying elements, and a corresponding superheating of the molten metallic substance, all take place. The reaction time and the reaction surface can be selected by choosing the reactivity and particle size of the carbonaceous material, as well as by selecting the height of the column 20, in any desired manner depending on the level of enrichment with carbon which is desired, so that the carbon content of the enriched metallic molten substance leaving the treating container 2 can be adjusted to any desired level up to and including the saturation level of the molten metallic substance with carbon.

The temperature of the body 20 and, therefore, the temperature of the molten metallic substance issuing from the treating container 2, can be controlled by controlling the rate of progression of the partial combustion of the carbonaceous material of the body 20, or by controlling the operation of the supply inlets 3 which are constructed as burners combusting fuel with oxygen. For instance, the temperature of the issuing metallic substance can be measured either thermo-electrically or optically, and the signals derived from these measurements can be fed into a conventional control arrangement which controls the admission of air or oxygen, of even of a fuel, into the region of the column 20.

The height of the body 20 can be measured by an arrangement 8 of conventional construction, such as an automatic sensor, or by means of a radiation-measuring device cooperating with a penetrating radiation generating device. The measured values derived from this measuring of the height of the body 20 are then utilized for controlling the replenishment of the consumed material of the body 20 so that, for instance, a predetermined filling height can be automatically maintained within relatively narrow limits.

While the treating container 2 is closed at the upper end by the gas-tight replenishing arrangement 7, the lower end of the treating container 2 is gas-tightly closed by the trap-like configuration of the metal-discharge or slag-discharge outlets 4 and 5, so that the reaction and combustion gases which are generated or liberated in the treating container 2 are forced to leave the treating container 2 through the outlet 1d. Now, when the treating container 2 is gas-tightly connected to the melting vessel 1, the flame-generating gases present in the melting vessel 1 are prevented from leaving the interior of the melting vessel 1 through the outlet 1d thereof. In such a manner, it is achieved that all gaseous reaction and combustion by-products can be used for their physically and chemically tied heat content for pre-heating the charge column 19 accommodated in the interior of the melting vessel 1. In this manner, an optimum utilization of energy is achieved.

As a result of the addition of slag-forming constituents, such as lime, fluxing agent, or also solid slag, dolomite, quartz or similar additives, and of alloying elements, into the reducing column or body 20 by means of the replenishing arrangement 7, it is possible to achieve a slag-forming operation, such as de-sulfurization, as well as an alloying of the molten metallic substance flowing through the body 20. In addition thereto, even oxidation-sensitive substances, such as non-conditioned sponge iron, can be introduced into the column 20 and melted.

The melting vessel 1 as well as the treating container 2 can, without encountering any difficulties, be put out of operation independently of one another and subsequently be put back into operation. When the arrangement of the present invention is put to a standstill for an extended period of time, the entire system should be, to the greatest practicable extent, rendered gas-tight. In order to prevent the penetration of oxygen or oxygen-containing media such as air into the interior of the system, or to render such penetration difficult, it is proposed to introduce small amounts of inert gas into the system so as to maintain the same at a slight superatmospheric pressure.

In the arrangement of the present invention, cast iron is produced already several minutes after the original commencement of the operation of the arrangement, which cast iron can be collected, for instance, in a ladle or in a forehearth. A particular advantage of the arrangement of the present invention is to be seen in the fact that the starting material or metallic substance can be melted without concern for oxidation, inasmuch as the possibly forming FeO slag is reduced during the passage thereof through the column or body 20. As a result of the fact that the metallic substance and slag trickle through the column 20 in fine streams, and that the slag layer 22 is to be penetrated by the molten metallic substance before reaching the bath 21, it is possible to achieve an effective and intense reducing reation, superheating, carburization and slag-forming operation. The superheating is achieved by means of fossil fuels without the use of electrical energy.

The reaction or combustion gases which are generated in the treating container 2 can act on the molten substance in a reducing manner as a result of the fact that they flow in countercurrent to the metallic substance entering the treating container 2 from the melting vessel 1, in addition to the fact that they supply their heat content in terms of sensible heat to such metallic substance.

The treating container 2 has dimensions which are relatively small compared to those of the melting vessel 1, so that the construction of the treating container 2 does not require any excessive expenditure and the container 2 can be constructed in an advantageous manner. The proportion of low-quality intermediate iron during the initiation and termination of the operation of the arrangement of the present invention is very low. The additions in the form of alloying elements, sponge iron and other oxygen-sensitive constituents, can be introduced into the interior of the treating container 2 without any losses inasmuch as the body 20 constitutes a reducing region.

It will be understood that each of the elements described above, or two or more together, may also find a useful application in other types of constructions differing from the types described above.

While the invention has been illustrated and described as embodied in a method and apparatus for producing cast iron, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing cast iron from scrap, sponge iron and similar iron-containing metallic substances, comprising the steps of accommodating a metallic substance in a first zone to form a column therein having an exposed lower surface which upwardly bounds an empty burning chamber in the first zone; confining a body of solid carbonaceous material only in a second zone separate from said first zone; melting the melallic substance only in the first zone, including combusting a fuel-oxygen mixture in the burning chamber of the first zone to form an oxidizing flame therein which acts from below on the exposed lower surface of the column; conducting the molten metallic substance through said burning chamber of said first zone and into said second zone; passing the molten metallic substance in the second zone through the body of solid carbonaceous material for the molten metallic substance to become enriched with carbon; and maintaining a bath of the enriched metallic substance and a layer of slag above the latter at the bottom of the second zone.

2. A method as defined in claim 1, and further comprising the step of utilizing combustible gases developing in the second zone during the passage of the molten substance therethrough as a fuel for heating the body of carbonaceous material in the second zone.

3. A method as defined in claim 1, wherein said confining step includes adding alloying agents to said body of carbonaceous material for alloying with the molten metallic substance during said passing step.

4. A method as defined in claim 1, wherein said maintaining step includes separating the slag from the enriched molten metallic substance at the bottom of the second zone.

5. A method as defined in claim 1, and further comprising the step of heating the body of carbonaceous material to a predetermined temperature, including introducing an oxygen-containing medium into the second zone and contacting the same with the carbonaceous material to partially combust the latter.

6. A method as defined in claim 5, wherein said heating step further includes introducing a combustible medium into the second zone, and combusting the same with the oxygen-containing medium.

7. A method as defined in claim 5; and further comprising the steps of measuring the temperature of the enriched molten metallic substance; and controlling the heating step in dependence on the measured temperature.

8. A method as defined in claim 1, and further comprising the steps of measuring the height of the body of carbonaceous material in the second zone; and replenishing the body in dependence on the measured height with additional carbonaceous material.

9. A method as defined in claim 1, and further comprising the step of adding a slag-forming constituent to the body of carbonaceous material.

10. A mthod as defined in claim 1, and further comprising the step of introducing a finely particulate metallic substance selected from the group consisting of scrap and sponge iron into the second zone for entrainment in the body of carbonaceous material.

11. A method as defined in claim 1, and further comprising the step of utilizing combustible gases developing in the second zone during the passage of the molten metallic substance therethrough as a fuel for heating the metallic substance in the first zone during said melting step.

* * * * *